United States Patent [19]

Brueckner

[11] Patent Number: 4,911,059
[45] Date of Patent: Mar. 27, 1990

[54] RAIL LAUNCHER FOR SUSPENDING AND LAUNCHING DIFFERENT TYPES OF FLYING BODIES FROM A CARRIER

[75] Inventor: Hartmut Brueckner, Munich, Fed. Rep. of Germany

[73] Assignee: Messerschmitt-Boelkow-Blohm GmbH, Munich, Fed. Rep. of Germany

[21] Appl. No.: 346,890

[22] Filed: May 2, 1989

[30] Foreign Application Priority Data

May 3, 1988 [DE] Fed. Rep. of Germany ....... 3815038

[51] Int. Cl.⁴ .............................................. F41F 7/00
[52] U.S. Cl. .................................. 89/1.819; 89/1.806; 89/1.813
[58] Field of Search ................ 89/1.819, 1.806, 1.51, 89/1.58, 1.813

[56] References Cited

U.S. PATENT DOCUMENTS

| | | | |
|---|---|---|---|
| 3,040,629 | 6/1962 | Duncan et al. | 89/1.806 |
| 4,392,411 | 7/1983 | Minkler | 89/1.819 |
| 4,660,456 | 4/1987 | Griffin et al. | 89/1.819 |
| 4,711,151 | 12/1987 | Griffin et al. | 89/1.819 |
| 4,736,669 | 4/1988 | Long et al. | 89/1.819 |
| 4,745,840 | 5/1988 | Long et al. | 89/1.819 |
| 4,750,404 | 6/1988 | Dale | 89/1.819 |
| 4,829,876 | 5/1989 | Witt | 89/1.819 |

Primary Examiner—David H. Brown
Attorney, Agent, or Firm—W. G. Fasse; D. H. Kane, Jr.

[57] ABSTRACT

A rail launcher for suspending different types of flying bodies from a carrier such as a carrier aircraft, is constructed as an elongated, substantilly empty shell with cross-sectional configurations which vary along the length of the shell housing. Different types of rail pairs are provided along a downwardly facing side of the shell housing for accommodating different types of flying bodies of various lengths. All the components required for strapping, retaining, ignition, and control purposes are mounted in cells of the shell housing. Due to the use of modular housing mounting means, the same type of rail launcher can be adapted for attachment to different types of carrier aircraft.

7 Claims, 2 Drawing Sheets

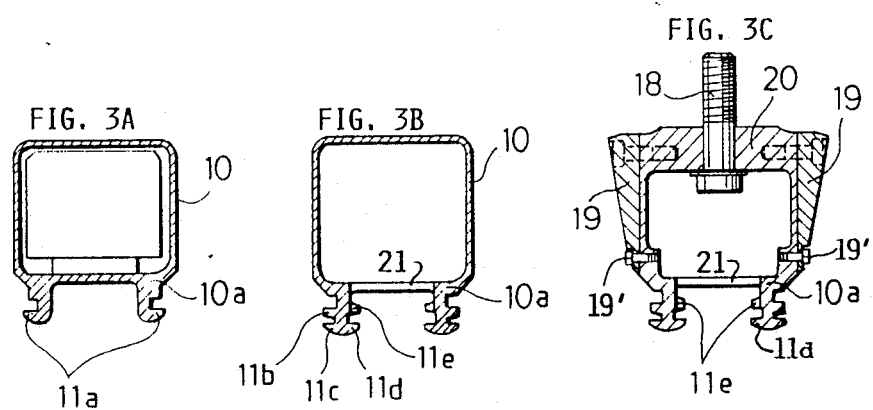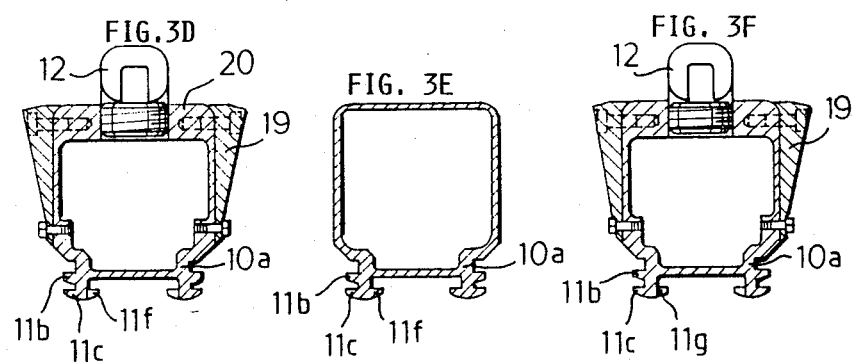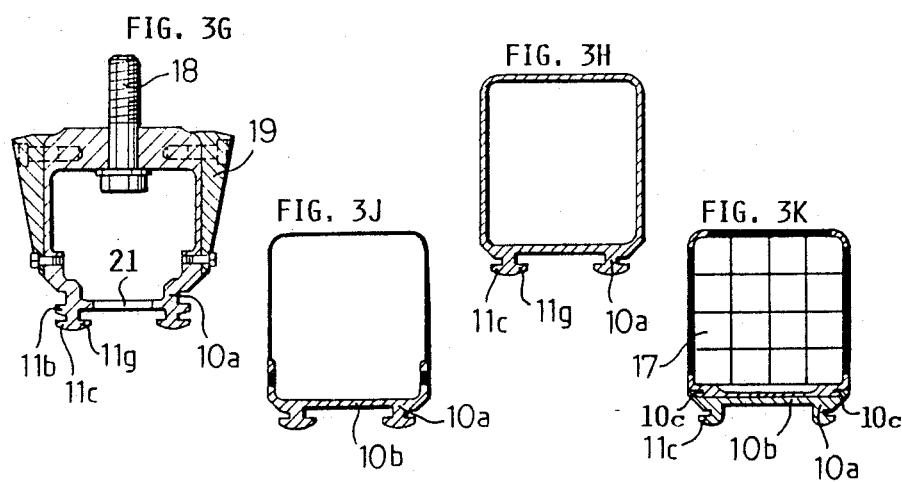

RAIL LAUNCHER FOR SUSPENDING AND LAUNCHING DIFFERENT TYPES OF FLYING BODIES FROM A CARRIER

CROSS-REFERENCE TO RELATED APPLICATION

The present disclosure is related to the disclosure of U.S. Ser. No. 07/353,387, filed on the same date, namely, May 2, 1989 with the present application and entitled: "APPARATUS FOR SUSPENDING, STRAPPING, AND LAUNCHING A FLYING BODY FROM A CARRIER".

FIELD OF THE INVENTION

The invention relates to a rail launcher for suspending and launching different types of flying bodies, such as missiles from a carrier, especially an aircraft.

BACKGROUND INFORMATION

Conventionally, each type of flying body requires for its launching from a carrier, such as an aircraft, a specially constructed launcher or launching equipment. If such equipment is to be changed for launching another type of flying body or rocket, a relatively expensive modification operation is required on the launcher or launching equipment so that it can hold another type of flying body. Additionally, substantial changes are required that enable the attachment of the launching equipment to different types of carriers.

Different weapons carrier locks or launchers are also known. Each of these locks is capable of carrying a particular type of droppable weapon, such as a bomb. These conventional weapons carrier locks are so constructed that they are adaptable for use in different types of carriers, primarily different types of aircraft. However, these weapons carrier locks are always constructed for one particular type of weapon. In any event, conventional structures of the launching or dropping type have a solid, heavy construction and are hard to modify.

OBJECTS OF THE INVENTION

In view of the above it is the aim of the invention to achieve the following objects singly or in combination:

to construct a rail launcher in such a way that it is easily adaptable in two different ways, namely first for launching different types of flying bodies, and second for attaching the launcher to different types of weapons carriers such as different types of aircraft;

to construct such a rail launcher with a light weight housing structure and a rail, whose cross sectional geometry is adapted to the different types of suspension lugs or hooks and the length of the different types of flying bodies.

to construct such a launcher that it can carry and launch missiles of different lengths and types of suspension lugs without requiring structural modifications, nor any change in its mounting structure and elements for carrying the launcher at different carriers.

SUMMARY OF THE INVENTION

According to the invention a launcher is characterized in that along the housing length there are different cross-sectional configurations of the housing proper. At least one pair of rails is formed as an integral part of the housing. The length of this pair of rails and the cross-sectional configuration of each rail member of the pair is constructed for taking up different types of flying bodies. Preferably, several pairs of rails are arranged alongside each other. Specifically, pairs of rails may be arranged next to each other or one above the other. Further, the number of rail pairs may change along the length of the housing.

The combination of a housing shell structure with launching rails integrated directly into the housing results in an especially lightweight structure. Further, any part of the entire length of the housing is quite suitable for reinforcement and attachment to different types of carriers, particularly different types of aircraft. Such housing length also accommodates flying bodies of different lengths that can be carried by different types of aircraft without the need for structural modifications and changes in the mounting structure for securing the launcher to the carrier.

By changing the cross-sectional configuration of the housing and the rail along its length, the invention provides a simple, yet very effective way for carrying different types of flying bodies, by the same type of housing and pair of rails.

BRIEF DESCRIPTION OF THE DRAWINGS

In order that the invention may be clearly understood, it will now be described, by way of example, with reference to the accompanying drawings, wherein:

FIGS. 3A to 3K show cross-sectional views through the present launcher along respective section planes indicated in FIGS. 1 and 2.

DETAILED DESCRIPTION OF PREFERRED EXAMPLE EMBODIMENTS AND OF THE BEST MODE OF THE INVENTION

Figure 1:
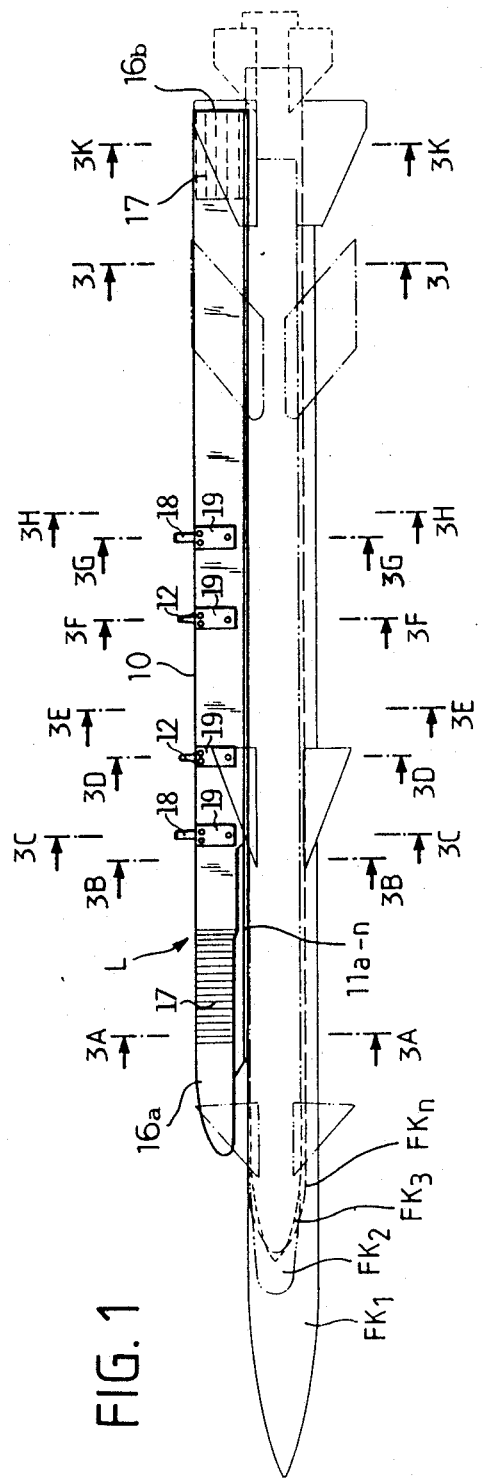
FIG. 1 is a side view of a launcher according to the invention and illustrates several types of missiles that can be secured to and carried by the present launcher which in turn is secured to a carrier not shown in FIG. 1.
Figure 2:
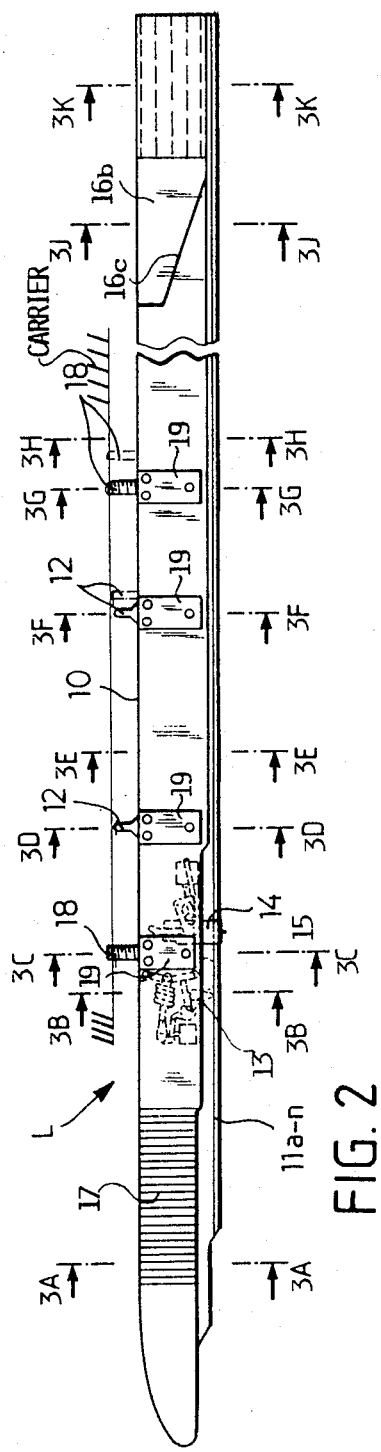
FIG. 2 is side view similar to that of FIG. 1 on a somewhat enlarged scale but omitting the different types of missiles and symbolically showing a carrier to which the launcher is secured.

Referring to FIGS. 1 and 2, the housing 10 according to the invention forms together with the load, such as a missile FK1, FK2 to FKN a carrier system L that is attachable to a carrier such as an airplane shown in FIG. 2. The attachment of the housing 10 to the carrier is accomplished by conventional mounting elements, such as lugs (eyelets) 12 and threaded bolts 18.

According to the invention the individual cross-sectional configurations through the housing 10 at section planes A—A to K—K are so selected that the particular housing portion is capable of taking up the forces that occur in the respective cross-section. In other words, the cross-sectional thickness or rather cross-sectional surface area, is optimally reduced with regard to the forces occurring in each individual cross-section. As a result, the cross-sections, or rather cross-sectional configurations, change along the length of the housing 10. The basic cross-section having a substantially square configuration is shown, for example, in FIGS. 3A, 3B, and 3E. At these locations, and also at locations corresponding to the sectional planes H—H and J—J the wall thickness is relatively small because the forces occurring in those areas are relatively small. On the other hand, the cross-sections are substantially reinforced at locations C—C, D—D, F—F, and G—G as shown in FIGS. 3C, 3D, 3F, and 3G. These cross-sectional housing portions are reinforced because larger forces occur in these areas where the housing is secured to the carrier aircraft, for example, by conventional mounting elements 12 and 18. In these areas housing reinforcing components namely side plates 19 and top plates 20 are used to reinforce the strength of the respective housing cross section. When the launcher is mounted wih lugs 42 the reinforcing components 19 and rotionally work as sway brace pads, avoiding the swaying of launcher and missile at the suspension system of the carrier. The reinforcing top plate 20 is preferably an integral component of the housing where the mounting elements 12, 18 are secured to the housing, while the reinforcing plates 19 are separate elements secured to the housing 10 by threaded bolts 19', and can be used or dismounted for weight saving, when the launcher is mounted with side plates 18.

According to the invention the downwardly facing part of the housing 10 is equipped with reinforcing sections 10a to which the several different rail sections are secured, either as integral components of the housing, or as exchangeable attachment components. For accommodating a random number N of rockets FK1 to FKN, the housing is equipped according to the invention with a number of rail pairs 11a to 11n. The length of the individual rail pairs 11a to 11n is adapted to the length of the rocket that is to be carried by the respective rail pair. FIG. 1 shows how the different types of rockets FK1 to FKN having different lengths are held by the various types of rail pairs 11a to 11n.

FIG. 2 shows in dashed lines retaining components 13, ignition components 14 for igniting the individual propulsion system of a flying body strapped to the housing 10, and strapping components 15 for strapping a flying body in place. Components 13, 14 and 15 may preferably be combined to one module. These retaining components 13 which hold the rocket after the strapping components have been unlocked, and the ignition components 14, as well as the strapping components 15, are disclosed in more detail in the above mentioned copending U.S. patent application U.S. Ser. No. ; 07/353,387, filed May 2, 1989. The disclosure of said copending application is hereby incorporated by reference into the present disclosure.

The pairs of rails 11a, 11b to 11n are arranged with their respective lengths relative to the housing 10 in such a way that for all types of flying bodies FK1, FK2 ... the same retaining components 13, the same ignition components 14, and the same strapping components 15 can be used. The rails form an integral part of the housing, as mentioned. All three components 13, 14, and 15 are mounted a forward portion of in the housing 10 as shown in FIG. 2 in such positions that different types of flying bodies can be handled by these components. The components 13, 14, and 15, as well as the suspension eyelets 12 and the mounting bolts 18 are constructed as modular units which can be positioned in and along the housing in accordance with the requirements of different types of carrier aircraft. Due to the use of modular components, it is possible to adapt the present launcher to different carrier aircraft without any modifications and problems.

Referring to FIGS. 3A to 3K the different cross-sectional configurations along the length of the present housing 10, have housing side walls with reinforced lower edges as shown at 10a, while the housing cross-section at most locations can be relatively thin, please see FIGS. 3A, 3B, 3E, 3H and 3J. For integrating the rail sections in to the housing, these rail sections may be formed by a milling operation. However, the invention also contemplates securing separate rail sections to the housing proper, for example, by threaded bolts or by welding. Milled rail sections, however, are preferred since it is possible to form the most varied rail cross-sectional configurations by modern milling machine tools in which the milling head is controlled by electronic means.

These various cross-sectional configurations shown in FIGS. 3A to 3K can be formed by a modern milling machine tool in one milling operation. For example, the rails 11a are provided for the longest missile FK1, whereby the section 11a merges into a section 11b for another type of missile, for example, FK3 capable of running along the same rails, but not requiring their full length.

However, in order to keep weight to an optimal low value, the individual rails have only that length which is absolutely necessary for the intended missile or load type. Thus, the rail pair 11e is, for example, shorter than the rail pair 11d running below and parallel to the rail pair 11e. The rail section 11D ends at the cross-section shown in FIG. 3C. Rail section 11F begins in the section of FIG. 3D and ends in the section of FIG. 3E. Rail section 11G begins in the cross-sectional zone of FIG. 3F and ends in the cross-sectional zone of FIG. 4.

The nose cone 16a of the present housing 10 is also constructed as a light shell structure that is easily removable and replaceable. Similarly, the tail cover 16b is constructed as a removable lightweight shell-type cover which is separable from the housing 10 along line 16c as shown in FIG. 2. Especially the nose cone 16a is constructed with due regard to aerodynamic flow conditions. The housing 10 can be constructed of thin sheet metal or of fiber reinforced synthetic mats to form a multicell shell. The empty cells in the shell serve for mounting the above mentioned components 13, 14, and 15. Especially a front or tail cell is suitable for mounting or installing the control electronic components 17 for the ignition and launching of the different types of missiles FK1 to FKN. The components 17 may even be mounted directly in the tail cover 16b so as to be removable with the tail cover for maintenance or exchange work. Instead of electronic components 17 a dispenser for chaff flare, decoy for electronical countermeasures may be used in the tail cover 16b.

FIGS. 3B, 3C, and 3G show holes 21 in the bottom wall of the housing 10 for providing easy access to all components, e.g. 13, 14, 15, mounted inside the housing 10.

FIG. 3K shows a separate bottom wall section 10b having reinforced edges 10a. The rails 11c form an integral part of the reinforced edges 10a of the bottom wall section 10b.

Tongue and groove means 10c, e.g., secure the bottom wall section 10c to the housing proper.

Although the invention has been described with reference to specific example embodiments, it will be appreciated that it is intended to cover all modifications and equivalents within the scope of the appended claims.

What I claim is:

1. A rail launcher for suspending different types of flying bodies having a maximum length from a carrier for launching any one of said flying bodies from said carrier, comprising a substantially hollow, elongated housing member having different cross-sectional configurations along its length perpendicularly to a longitudinal housing axis, at least one pair of rail means constructed as an integral part of said housing member along a downwardly facing side of said housing member, said integral rail means having a length sufficient for carrying any one of said flying bodies up to said maximum length, said rail means further having a crossectional rail shape for accommodating any one of said different types of flying bodies, flying body retaining components (13), flying body strapping components (15), and flying body ignition components (14), all of said components being mounted in a forward portion of said hollow housing member so that the same components are usable for different types of flying bodies, mounting means (12, 18) attached to said housing member in such positions along the length of an upper side of said housing member that said housing member can be secured to different types of carriers, separate housing reinforcing side plates (19) and screw means (19') securing said separate side plates (19) to side walls of said housing member where said mounting means (12, 18) are attached to said upper side of said housing member.

2. The rail launcher of claim 1, wherein said rail means comprise a plurality of rail pairs, each rail pair having a different cross-sectional rail shape integral with said housing member, and wherein the number of rail pairs changes along the length of said housing member.

3. The rail launcher of claim 1, further comprising reinforced wall sections (10a) reaching downwardly from side walls of said hollow housing member, said reinforced wall sections (10a) being thicker than a normal wall thickness of said housing member, said rail means being milled into said reinforced wall sections to form an integral structure of said housing member and said rail means.

4. The rail launcher of claim 1, further comprising thickened edge portions (10a) forming part of a bottom wall section of said housing member, said rail means being integrally formed in said thickened edge portions.

5. The rail launcher of claim 1, further comprising housing reinforcing top plates (20) forming an integral part of said upper side of said housing member.

6. The rail launcher of claim 1, wherein said hollow housing member is constructed as a lightweight hollow shell enclosing a plurality of hollow cells, said hollow shell further comprising a nose cone (16a) and an tail closure cover 16b.

7. The rail launcher of claim 5, further comprising electronic control means (17) for said different types of flying bodies, said electronic control means being mounted in a front or tail cell or in said tail closure cap cover.

* * * * *